(12) United States Patent
Suetsugu et al.

(10) Patent No.: US 7,095,935 B2
(45) Date of Patent: Aug. 22, 2006

(54) METHOD FOR FORMING OPTICAL WAVEGUIDE

(75) Inventors: Tatsuya Suetsugu, Osaka (JP); Kohei Kadono, Ikeda (JP); Norimasa Kominami, Osaka (JP); Takeshi Ohtani, Osaka (JP); Hiroaki Yokoi, Osaka (JP); Minoru Takada, Osaka (JP); Takashi Tarumi, Osaka (JP); Toshihiko Einishi, Osaka (JP); Tetsuo Yazawa, Ikeda (JP)

(73) Assignees: Isuzu Glass Co., Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/499,419

(22) PCT Filed: Dec. 9, 2002

(86) PCT No.: PCT/JP02/12841
§ 371 (c)(1),
(2), (4) Date: Jun. 18, 2004

(87) PCT Pub. No.: WO03/054597
PCT Pub. Date: Jul. 3, 2003

(65) Prior Publication Data
US 2005/0152657 A1    Jul. 14, 2005

(30) Foreign Application Priority Data
Dec. 20, 2001 (JP) ............................ 2001-387520

(51) Int. Cl.
*G02B 6/10* (2006.01)
*C03C 21/00* (2006.01)

(52) U.S. Cl. ...................... 385/129; 385/132; 385/142; 65/30.13; 65/386

(58) Field of Classification Search ........ 385/129–132, 385/141, 142; 65/386, 400, 30.13; 438/514, 438/530, 542, 558, 562
See application file for complete search history.

(56) References Cited

U.S. PATENT DOCUMENTS 3,511,681 A * 5/1970 Huey .......................... 427/269

(Continued)

FOREIGN PATENT DOCUMENTS

JP    6-24801 A    2/1994

(Continued)

OTHER PUBLICATIONS

F. Gonella et al. Experimental study of copper-alkali ion exchange in glass. Journal of Applied Physics, vol. 83 No. 1, pp. 1200-1206, Feb. 1998.*

(Continued)

*Primary Examiner*—Rodney Bovernick
*Assistant Examiner*—Mike Stahl
(74) *Attorney, Agent, or Firm*—Knobbe, Martens, Olson & Bear, L L P

(57) ABSTRACT

The present invention provides a method for forming an optical waveguide characterized by applying a paste containing a copper compound to a glass substrate containing an alkali metal as a glass component over the whole surface thereof or in a patterned form, and performing heat treatment at a temperature lower than the softening temperature of the glass substrate.

The method of the invention can produce an optical waveguide without the need for a high vacuum as in the thin film deposition method and without the use of a molten salt, and is capable of dispersing $Cu^+$ ions selectively in a glass substrate with excellent controllability.

16 Claims, 2 Drawing Sheets

U.S. PATENT DOCUMENTS

| | | | |
|---|---|---|---|
| 3,873,408 A * | 3/1975 | Hensler | 428/212 |
| 3,907,586 A * | 9/1975 | Kiefer | 501/66 |
| 3,997,312 A * | 12/1976 | Besselink | 65/30.13 |
| 5,127,931 A * | 7/1992 | Kiefer et al. | 65/30.13 |
| 5,597,614 A * | 1/1997 | Noguchi et al. | 427/162 |
| 6,141,479 A * | 10/2000 | Heo et al. | 385/141 |

FOREIGN PATENT DOCUMENTS

| | | |
|---|---|---|
| JP | 6-157074 A | 6/1994 |
| JP | 2000-24514 A | 1/2000 |

OTHER PUBLICATIONS

J. Spirkova et al. Copper doped waveguides in glass substrates. Fiber and Integrated Optics, vol. 21 No. 1, pp. 63-74, Jan. 2002.*

D. Salazar et al. Optical channel waveguides by copper ion-exchange in glass. Applied Optics, vol. 36 No. 34, pp. 8987-8991, Dec. 1997.*

Neblova, P. et al. (2001) "A study of the preparation and properties of copper-containing optical planar glass waveguides" Solid State Ionics 141-142:609-615.

* cited by examiner

METHOD FOR FORMING OPTICAL WAVEGUIDE

This application is the U.S. National Phase under 35 U.S.C. §371 of International Application PCT/JP02/12841, filed on Dec. 9, 2002, which claims priority of Japanese Patent Application No. 2001-387520, filed on Dec. 20, 2001. The International Application was published under PCT Article 21(2) in a language other than English.

TECHNICAL FIELD

The present invention relates to a method for forming an optical waveguide and to an optical waveguide obtained by the method.

BACKGROUND ART

Methods for producing an optical waveguide are roughly classified into thin film deposition methods and ion exchange methods.

The thin film deposition method is a method of depositing an optical waveguide layer having silica as a principal component on a substrate made of silicon, etc. Specifically, sputtering methods, CVD methods, flame deposition methods and the like are known. Disadvantageously, all these methods need high vacuum equipment for the production of waveguides and use complicated production processes, therefore resulting in increased costs. Also, in the CVD methods, flame deposition methods, etc., dangerous gases, such as $SiH_4$, $SiCl_4$ or the like, may be used, entailing high costs. Furthermore, the flame deposition method has disadvantages in that exposure to the high temperatures of about 1200° C. to about 1300° C. in the production process tends to degrade the substrate, and in addition causes internal stress in the substrate, increasing the polarization dependence of guided light, as well as other problems.

The ion exchange method is a method of using a multi-component glass which contains $Na^+$ ions as a substrate and immersing the glass substrate in a molten salt containing $K^+$ ions, $Tl^+$ ions, $Ag^+$ ions, etc. to exchange $Na^+$ ions in the glass for $K^+$ ions, $Tl^+$ ions, $Ag^+$ ions or the like in the molten salt. Further, during the ion exchange, an electric field may be applied to increase the ion exchange rate, ion diffusion rate, etc. This method can raise the refractive index of the portion where ion exchange has been carried out, forming an optical waveguide layer. Unlike the thin film deposition method, the ion exchange method does not need a high vacuum, and the temperature of a molten salt is usually in the range of about 250° C. to about 400° C. Thus the production facilities are low-cost. However, it is necessary to strictly control the composition, temperature, etc. of the molten salt, which influence the rate of ion exchange, the rate of ion diffusion in the glass substrate, etc. Moreover, the temperature of ion exchange is influenced by the melting temperature of the molten salt. Therefore, when producing an optical waveguide having a desired refractive index profile by the ion exchange method using a molten salt, a high level of expertise is needed in the determination of ion exchange conditions such as the composition and temperature of the molten salt, processing time, etc.

Furthermore, since the ions introduced by the ion exchange method are monovalent cations, the ions used at present are limited to $K^+$, $Tl^+$, $Ag^+$, etc., in almost all cases. However, these ions only serve to increase the refractive index of a waveguide portion. Therefore, an optical waveguide produced by introducing these ions only confines light in the waveguide layer and propagates the light from one side of the waveguide to the other. It is difficult to provide a waveguide with active optical functions, such as optical amplification, switching, etc.

The production of a waveguide having optically active functionality can be achieved by dispersing the ions, chemical species, etc. which can emit light with high efficiency or have the capability of changing the index of refraction with the intensity of light, that is, a high optical nonlinearity. Then, the emission of light enables optical amplification by induced radiation, and optical nonlinearity enables optical switching. One example of the ion with such characteristics is the copper(I) ion, and chemical species with such characteristics are copper(I) halide fine particles, copper(I) oxide fine particles, copper metal fine particles, etc. These are chemical species formed from monovalent copper ions or metallic copper produced by the reduction of copper ions; therefore, introducing monovalent copper ions into glass for the production of a waveguide makes it possible to provide the above-mentioned optically active waveguide.

In recent years, attempts have been made to produce an optical waveguide by introducing $Cu^+$ ions (F. Gonella, F. Caccavale, L. D. Bogomolova, F. D'Acapito and A. Quaranta, J. Appl. Phys. 83, 1200 (1998); Jarmila Spirkova, Pavlina Nebolova, Ivan Jirka, Karel Mach, Vratislav Perina, Anna Mackova and Gabrila Kuncova, SPIE, Photonics West 2001, Conference 4277-47 (January 2001)). These references disclose that a molten salt of a copper(I) halide, a mixed $CuSO_4$—$Na_2SO_4$ molten salt, etc. are used for introducing copper ions by ion exchange. However, when a copper(I) halide molten salt is used, ion exchange needs to be performed in a reducing atmosphere because $Cu^+$ ions tend to be oxidized in air. When a mixed $CuSO_4$—$Na_2SO_4$ molten salt is used, ions are exchanged after $Cu^{2+}$ is reduced to $Cu^+$, so that the rate of ion exchange is slow, and its control is difficult. Further, in a waveguide thus produced, monovalent copper ions and divalent copper ions are mixed, making it difficult to control the refractive index of the waveguide. Furthermore, the great difference in diffusion rate between the coexistent monovalent and divalent copper ions makes it extremely difficult to control the cross-sectional profile of the waveguide. Further problems also arise, including the difficulty of controlling the state of $Cu^+$ present in the waveguide to obtain the desired optical characteristics.

DISCLOSURE OF THE INVENTION

A principal object of the present invention is to provide a novel method for producing an optical waveguide, whereby $Cu^+$ ions can be selectively dispersed in a glass substrate with excellent controllability, without the need for a high vacuum as in the thin film deposition method and without using a molten salt.

The present inventors conducted extensive research in order to achieve the above-mentioned object. As a result, it was found that according to a method of applying a paste containing a copper compound and an organic resin suspended in an organic solvent to a substrate made of a glass material containing an alkali metal and then performing heat treatment, the copper ions contained in the paste are diffused into the glass substrate as $Cu^+$ ions simply by heating at a relatively low temperature of about 500° C. without the need for a reducing atmosphere. Further, it was found that according to such a method, a waveguide having active optical functions such as optical amplification, switching, etc. can be produced. Based on this finding, the invention has been accomplished.

The present invention relates to a method for forming an optical waveguide and to an optical waveguide obtainable by the method.

1. A method for forming an optical waveguide, comprising applying a paste containing a copper compound, an organic resin and an organic solvent to a glass substrate containing an alkali metal as a component of the glass over the whole surface thereof or in a patterned form, and performing heat treatment at a temperature lower than the softening temperature of the glass substrate.

2. The method for forming an optical waveguide according to the above item 1, wherein the glass substrate is made of a silicate glass, borosilicate glass or phosphate glass, the glass comprising at least 2% by weight of alkali metal, calculated on an oxide basis.

3. The method for forming an optical waveguide according to the above item 2, wherein the glass substrate is a borosilicate glass substrate comprising 40% to 82% by weight of $SiO_2$; 12% to 50% by weight of $B_2O_3$; 2% to 25% by weight of at least one component selected from the group consisting of $Na_2O$, $K_2O$, $Li_2O$, $Rb_2O$ and $Cs_2O$; up to 25% by weight of at least one component selected from the group consisting of MgO, CaO, BaO, ZnO, SrO and PbO; up to 20% by weight of at least one component selected from the group consisting of $Al_2O_3$, $La_2O_3$, $Y_2O_3$, $Ta_2O_3$ and $Gd_2O_3$; up to 10% by weight of at least one component selected from the group consisting of $Nb_2O_5$ and $ZrO_2$; up to 5% by weight of at least one component selected from the group consisting of $As_2O_3$, $Sb_2O_3$ and SnO; and 0.05% to 10% by weight of at least one component selected from the group consisting of Cl, Br and I.

4. An optical waveguide obtainable by a method according to any one of the above items 1 to 3, which is a slab optical waveguide or a channel optical waveguide.

The method of the present invention is a method for forming an optical waveguide in a glass substrate. This method requires the use of a glass substrate which is made of glass containing an alkali metal as a component of the glass.

Examples of the alkali metal used in the glass substrate include Li, Na, K, Rb, Cs, etc., and among these, Li, Na, K, etc. are preferable. The alkali metals may exist in an ionic state, or may exist as an oxide. The alkali metals may exist singly or may coexist in combination of two or more.

The glass substrate usually has an alkali metal content of at least about 2% by weight, preferably at least about 5% by weight, and more preferably at least about 10% by weight, calculated on an oxide basis. Although the maximum alkali metal content is not restricted, the glass substrate usually has a maximum alkali metal content of about 40% by weight, preferably about 30% by weight, and more preferably about 20% by weight, calculated on an oxide basis.

In the present invention, any glass containing an alkali metal can be used without limitation. For example, silicate glass, borosilicate glass, phosphate glass, etc. can be used.

The composition of these glasses is not limited. Any glass containing the above-mentioned alkali metal and having a composition known as silicate glass, borosilicate glass, phosphate glass, etc. can be used. Examples of such glass are silicate glass containing about 70% to about 74% by weight of $SiO_2$, about 13% to about 16% by weight of at least one component selected from the group consisting of $Li_2O$, $Na_2O$ and $K_2O$, about 10% to about 13% by weight of at least one component selected from the group consisting of CaO, MgO and BaO, and about 1.5% to about 2.5% by weight of $Al_2O_3$, calculated on an oxide basis; borosilicate glass containing about 60% to about 80% by weight of $SiO_2$, about 10% to about 28% by weight of $B_2O_3$, about 5% to about 10% by weight of at least one component selected from the group consisting of $Li_2O$, $Na_2O$ and $K_2O$, and up to about 5% by weight of $Al_2O_3$, calculated on an oxide basis; phosphate glass containing about 20% to about 50% by weight of $P_2O_5$, about 3% to about 35% by weight of $SiO_2$, about 10% to about 35% by weight of $Al_2O_3$, and about 5% to about 10% by weight of at least one component selected from the group consisting of $Li_2O$, $Na_2O$ and $K_2O$, calculated on an oxide basis; and so on.

In the present invention, a paste containing a copper compound is applied to the glass substrate containing an alkali metal, and heat treatment is performed at a temperature lower than the softening temperature of the glass substrate.

The paste to be used is one that is obtained by dispersing a copper compound and an organic resin in an organic solvent. Any such paste can be used as long as the paste has a viscosity that allows its application to a glass substrate and contains a copper compound capable of diffusing copper ions by heat treatment.

The copper compound contained in the paste is diffused into the glass substrate as $Cu^+$ ions in exchange for the alkali metal in the glass substrate by applying such a paste to the glass substrate and performing heat treatment. The copper contained in the paste is diffused as monovalent ions presumably because the organic resin contained in the paste is carbonized to produce a reducing atmosphere, by which monovalent copper ions are formed.

The copper compound contained in the paste may be any monovalent copper compound or any divalent copper compound. Examples of the copper compound include $CuSO_4$, $CuF_2$, CuCl, $CuCl_2$, CuBr, $CuBr_2$, $Cu_2O$, CuO, $Cu(NO_3)_2$, CuS, etc. Such copper compounds can be used singly or in combination of two or more.

Usable as the organic resin contained in the paste are the resins that are decomposed at the heat treatment temperature. It is preferable that such a resin be easily removed by washing with water, and examples of the resin to be used include cellulosic resins, acrylic resins, petroleum resins, etc. Such organic resins can be used singly or in combination of two or more.

The organic solvent used in the paste is preferably a solvent which volatilizes easily when being dried, and more specifically a solvent which is a liquid at room temperature and volatilizes at a temperature of about 50° C. to about 200° C. Examples of such a solvent include alcohols such as methanol, ethanol, etc.; dimethyl ether; ketones such as acetone, etc.; and so on. The organic solvents can be used singly or in combination of two or more.

Although the content of each component in the paste is not restricted, the paste usually has a copper compound content of about 20% to about 70% by weight, and preferably about 30% to about 55% by weight; an organic resin content of about 10% to about 30% by weight, and preferably about 15% to about 25% by weight; and an organic solvent content of about 3% to about 20% by weight, and preferably about 5% to about 10% by weight, based on the total weight of the paste.

If necessary, other additives may be further added to the paste. As such an additive, $Na_2SO_4$, $K_2SO_4$, $NaNO_3$, $KNO_3$, NaCl, NaBr, KCl, KBr, etc. can be used, for example, to lower the melting point of the paste or for other purposes. These additives are added to the paste so that the content of the additives in the paste is preferably up to about 20% by weight, and more preferably up to about 15% by weight.

The method of applying the paste to a glass substrate is not restricted, and known application methods can be suitably employed. For example, methods such as spin coating, spray coating, dip coating, etc. can be used.

Although the application thickness of the paste is not restricted and varies according to the type, amount, etc. of copper compound contained in the paste, the paste is usually applied to a thickness of about 0.5 mm to about 1.5 mm.

After applying the paste, the resulting paste film is usually dried prior to heat treatment. The drying conditions are not restricted as long as the film is dried so that the solvent component is adequately removed. Usually the film can be efficiently dried by heating at a temperature of about 150° C. to about 300° C. for about 30 minutes to about 1 hour.

Subsequently, the dried film is heat-treated. The heat treatment temperature is in the range of about 450° C. to about 700° C., and preferably in the range of about 500° C. to about 600° C., being set at a temperature lower than the softening temperature of the glass substrate. The heat treatment time is usually about 6 to about 48 hours, and preferably about 12 to about 24 hours. The atmosphere for heat treatment is not limited and may be any atmosphere including oxygen-containing atmospheres, inert atmospheres, reducing atmospheres, etc. Usually the heat treatment is carried out in an oxygen-containing atmosphere as in air, which is advantageous in that a reducing atmosphere is not needed.

Heat treatment by the above-mentioned method allows copper ions to diffuse as $Cu^+$ ions into a glass substrate. The diffused copper ions exist as $Cu^+$ ions, $Cu_2O$, copper metal fine particles, etc., depending on the treatment conditions. As a result, the portions containing these differ in refractive index from the rest of the glass substrate, thus forming an optical waveguide.

After heat treatment, the substrate is usually allowed to cool to room temperature, and the paste residue remaining on the substrate is washed away with water.

Also, in the production of an optical waveguide by the above-mentioned method, especially when the glass substrate is a borosilicate glass substrate containing, calculated on an oxide basis, 40% to 82% by weight of $SiO_2$; 12% to 50% by weight of $B_2O_3$; 2% to 25% by weight of at least one component selected from the group consisting of $Na_2O$, $K_2O$, $Li_2O$, $Rb_2O$ and $Cs_2O$; up to 25% by weight of at least one component selected from the group consisting of MgO, CaO, BaO, ZnO, SrO and PbO; up to 20% by weight of at least one component selected from the group consisting of $Al_2O_3$, $La_2O_3$, $Y_2O_3$, $Ta_2O_3$ and $Gd_2O_3$; up to 10% by weight of at least one component selected from the group consisting of $Nb_2O_5$ and $ZrO_2$, up to 5% by weight of at least one component selected from the group consisting of $As_2O_3$, $Sb_2O_3$ and SnO; and 0.05% to 10% by weight of at least one component selected from the group consisting of Cl, Br and I, the copper ions diffused in the glass substrate react with the halogen atoms contained in the glass substrate, such as Cl, Br, I, etc., giving copper halides. In this case, too, an optical waveguide having excellent characteristics is formed.

In the above-mentioned manner, the method of the present invention can form a slab optical waveguide by applying a paste containing a copper compound all over a glass substrate and performing heat treatment.

Furthermore, using the paste containing the copper compound to form a predetermined pattern on the glass substrate surface and thereafter performing heat treatment makes it possible to produce an optical waveguide corresponding to the form of the pattern, which is called a channel optical waveguide. There are no restrictions on the method for forming a pattern using the paste containing the copper compound, and known methods can be suitably employed. For example, a predetermined pattern can be formed by keeping a template such as a metal sheet having the intended pattern in contact with the glass substrate when applying the paste containing the copper compound. To form a more precise pattern, a channel optical waveguide can be formed by patterning a glass substrate surface using an inorganic film according to the photolithographic method, applying the paste containing the copper compound to the exposed portion of the glass substrate, and heat-treating. One example of this method is briefly described below.

First, metals such as Al, Ti, Ag, Cr, etc. or oxides such as $SiO_2$, etc. are deposited on a glass substrate by vapor deposition to form an inorganic film. Although the thickness of the deposited inorganic film is not restricted, the film is formed to a thickness of preferably about 0.25 µm to about 1 µm, and more preferably about 0.25 µm to about 0.5 µm. After depositing the inorganic film, a photoresist agent is applied to the film. Usable photoresist agents include organic photoresist agents in wide use that are commercially available. The method for applying the photoresist agent is not restricted, and methods such as spin coating, spray coating, dip coating, etc. can be used. Next, a patterned metal sheet is placed on the photoresist agent. Being exposed to ultraviolet light and developed, the photoresist agent forms a pattern. Thereafter, the inorganic film of the exposed portion is removed by etching, etc. according to the pattern, and the photoresist agent is removed. Thus the inorganic film forms a patterned film on the glass substrate surface. Subsequently, the paste containing the copper compound is applied over the inorganic film with the exposed portion of the glass substrate being pasted, and heat treatment is performed under the above-mentioned conditions, so that a channel optical waveguide can be formed.

The optical waveguide formed by the method of the present invention is one that is formed by the diffusion of monovalent copper ions into a glass substrate. The copper ions diffused in the glass substrate exist in forms such as copper(I) oxide fine particles, $Cu^+$, copper(I) halide fine particles, copper metal fine particles, etc. These components are capable of emitting light with high efficiency or have the capability of changing the refractive index with the intensity of light, that is, a high optical nonlinearity. For example, when the diffused copper ions exist as copper(I) halide fine particles, copper(I) oxide fine particles, copper metal fine particles, etc., they can produce excellent nonlinear optical effects. When the diffused copper ions exist as copper(I) halide fine particles, $Cu^+$, etc., they can provide highly efficient light emission.

In the optical waveguide formed by the method of the present invention, the emission of light allows optical amplification by induced radiation, and optical nonlinearity allows optical switching. Thus, the optical waveguide formed by the present method is very useful as a waveguide having active optical functionality.

As described above, the method of the present invention can form an optical waveguide simply by applying a paste containing a copper compound and heating in air, etc. This method does not require a high vacuum as in the thin film deposition method, so that an optical waveguide can be formed at low cost without a complicated production process. Because the method does not use a molten salt, strict control of a molten salt is not needed, and degradation of the substrate by the use of a molten salt does not occur.

Following the method of the present invention, $Cu^+$ ions can be selectively dispersed in a glass substrate with excellent controllability without the need for a reducing atmosphere, so that a waveguide having active optical functions such as optical amplification, switching, etc. can be easily formed.

BEST MODE FOR CARRYING OUT THE INVENTION

The present invention is described in further detail with reference to the following Examples.

EXAMPLE 1

Using each of borosilicate glass compositions No. 1 to No. 6 (produced by the melting method; size: 15 mm×15 mm×3 mm) shown in Table 1 (percentages by weight) as a glass substrate, optical waveguides were formed according to the procedure described below.

TABLE 1

|  | No. 1 | No. 2 | No. 3 | No. 4 | No. 5 | No. 6 |
| --- | --- | --- | --- | --- | --- | --- |
| $SiO_2$ | 53.7 | 48.7 | 49.5 | 50.4 | 65 | 65 |
| $B_2O_3$ | 21.0 | 27.4 | 27.9 | 27 | 27 | 24 |
| $Li_2O$ | 1.4 |  |  | 3 |  |  |
| $Na_2O$ | 6.5 | 11.5 |  | 8.7 | 6 | 4 |
| $K_2O$ | 1.4 |  | 11.7 |  |  | 2 |
| CaO |  |  | 1.8 |  |  |  |
| BaO |  |  |  | 0.5 |  |  |
| ZnO | 2.8 | 1.8 |  | 0.5 |  |  |
| $Al_2O_3$ | 9.4 | 7.1 |  | 7.9 |  | 3 |
| $ZrO_2$ | 0.5 |  |  |  |  |  |
| Cl |  |  | 1.8 |  | 1 |  |
| Br | 3.3 | 3.5 |  |  | 1 | 1 |
| I |  |  |  | 1.8 |  | 1 |

A paste of 55% by weight of $CuSO_4$, 10% by weight of $Na_2SO_4$, 15% by weight of acrylic resin, 10% by weight of cellulosic resin, and 10% by weight of alcohol was applied all over one side of each glass substrate to a thickness of 1 mm.

Subsequently, the pasted glass substrates were dried at 200° C. for 30 minutes, and were thereafter heat-treated in air at 510° C. for 48 hours.

In each heat-treated sample, it was confirmed that copper halides existed uniformly from the glass substrate surface down to 10 μm to 50 μm from the surface. It was also confirmed that the refractive index of the portion in which copper halides existed differed from that of the glass substrate portion.

Figure 1:
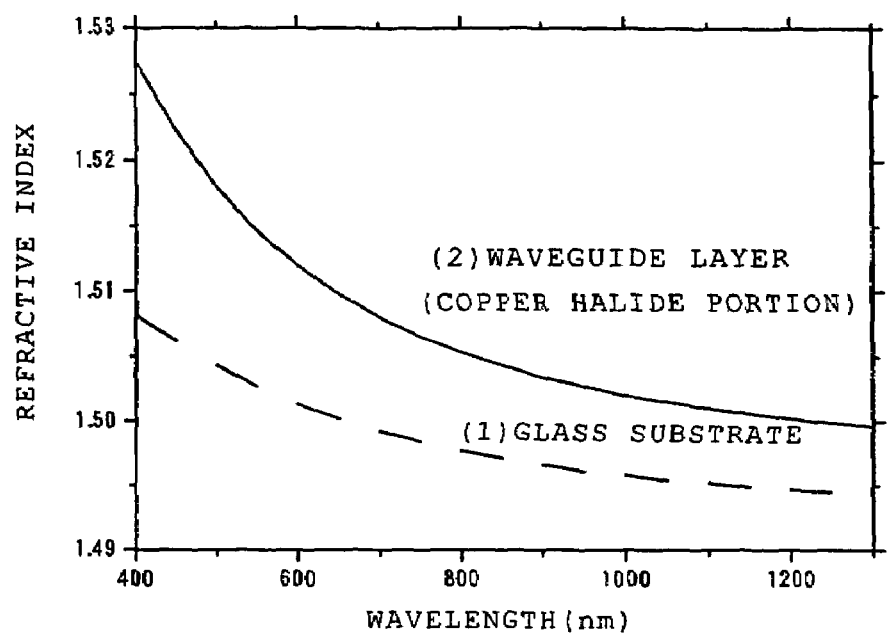
FIG. 1 is a graph showing the refractive indices of the glass substrate portion (1) and the waveguide layer portion (2) of the slab optical waveguide formed using glass substrate No. 1 in Example 1.

FIG. 1 shows the refractive indices of the glass substrate portion (1) and the copper halide portion (2) of glass substrate No. 1.

EXAMPLE 2

Using borosilicate glass composition No. 1 (produced by the melting method; size: 15 mm×15 mm×3 mm) shown in Table 1 as a glass substrate except that Br was excluded from the glass composition, an optical waveguide was formed according to the following procedure.

A metal sheet having a gap formed with a width of 300 μm was placed on one side of the glass substrate, and a paste of 55% by weight of $CuSO_4$, 10% by weight of $Na_2SO_4$, 15% by weight of acrylic resin, 10% by weight of cellulosic resin, and 10% by weight of alcohol was applied over the metal sheet to a thickness of 1 mm.

Subsequently, the metal sheet was removed. The pasted glass substrate was dried at 200° C. for 30 minutes, and was thereafter heat-treated in air at 510° C. for 48 hours.

In the heat-treated sample, it was confirmed that $Cu_2O$ had diffused only in the pasted thin line portion of the glass substrate.

Figure 2:
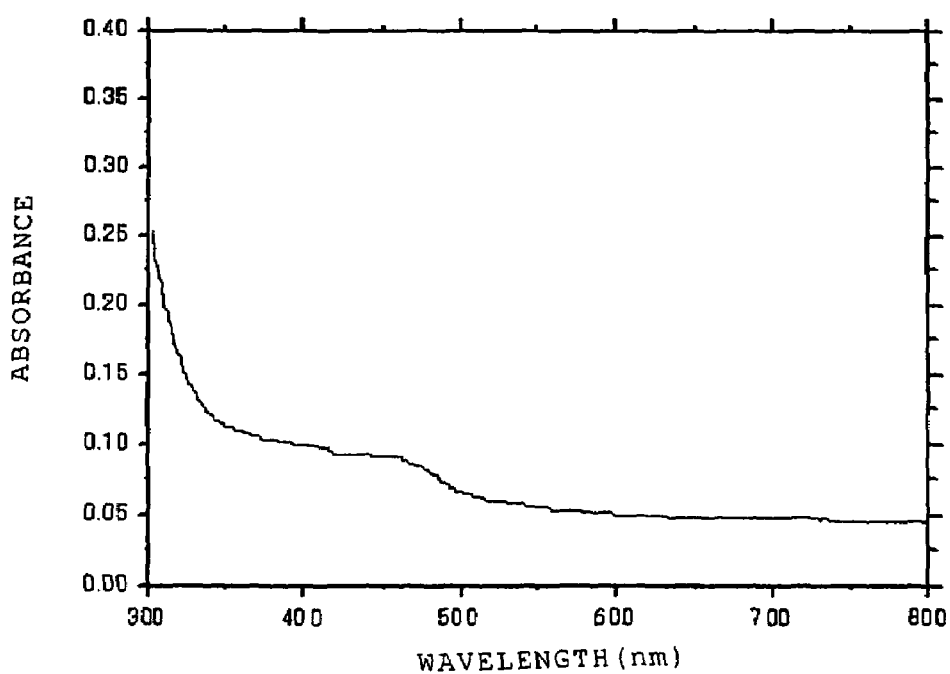
FIG. 2 is a graph showing the absorbance of the optical waveguide formed in Example 2.

FIG. 2 shows the absorbance of the thin line portion, where $Cu_2O$ diffused.

EXAMPLE 3

Using each of borosilicate glass compositions No. 1 to No. 6 (size: 15 mm×15 mm×3 mm) shown in Table 1 in Example 1 as a glass substrate, optical waveguides were formed according to the following procedure.

A metal sheet having a gap formed with a width of 300 μm was placed on one side of each glass substrate, and a paste of 55% by weight of $CuSO_4$, 10% by weight of $Na_2SO_4$, 15% by weight of acrylic resin, 10% by weight of cellulosic resin, and 10% by weight of alcohol was applied over the metal sheet to a thickness of 1 mm.

Subsequently, the metal sheets were removed. The pasted glass substrates were dried at 200° C. for 30 minutes, and were thereafter heat-treated in air at 510° C. for 48 hours.

In the heat-treated samples, it was confirmed that copper (I) halides had diffused only in the pasted thin line portion of the glass substrate.

Figure 3:
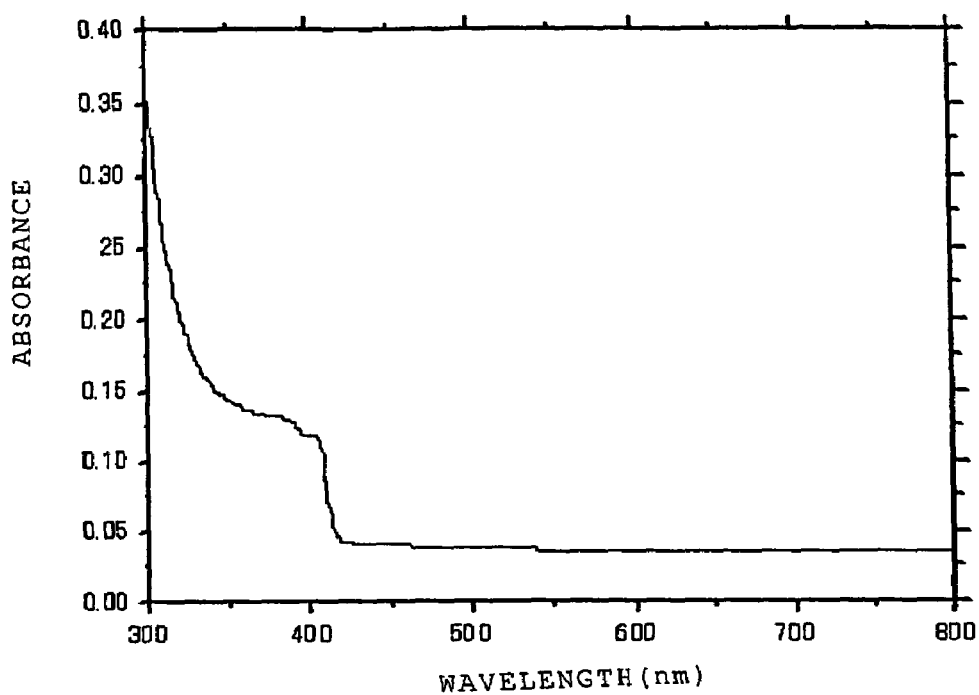
FIG. 3 is a graph showing the absorbance of the optical waveguide formed using glass substrate No. 2 in Example 3.

FIG. 3 shows the absorbance of the thin line portion, where copper(I) halides diffused, using borosilicate glass composition No. 2.

EXAMPLE 4

Using each of borosilicate glass compositions No. 1 to No. 6 (size: 15 mm×15 mm×3 mm) shown in Table 1 in Example 1 as a glass substrate, optical waveguides were formed according to the following procedure.

$SiO_2$ was vapor-deposited on the surface of each glass substrate to a thickness of about 0.5 μm by the sputtering method, and a commercially available positive photoresist agent (product of Tokyo Ohka Kogyo Co., Ltd., OFPR-8600) was applied thereon in a thickness of about 1.1 μm, using a spin coater.

A metal sheet having a gap formed with a width of 300 μm was placed on each glass substrate, and was exposed to ultraviolet radiation using an ultraviolet laser (output wavelength: 355 nm). Thereafter, the metal sheet was removed, and the photoresist agent of the portion exposed to ultraviolet light was removed using a developer. Furthermore, in order to remove the $SiO_2$ film of the developed portion, etching was performed using hydrofluoric acid, and the glass substrate surface was exposed.

Subsequently, the photoresist film was removed, and a paste of 55% by weight of $CuSO_4$, 10% by weight of $Na_2SO_4$, 15% by weight of acrylic resin, 10% by weight of cellulosic resin, and 10% by weight of alcohol was applied over the inorganic film to a thickness of 1 mm, with the exposed portion of the glass substrate being pasted.

Then, the pasted glass substrates were dried at 200° C. for 30 minutes, and were thereafter heat-treated in air at 510° C. for 48 hours.

As a result, it was confirmed that copper(I) halides had diffused into the glass substrate only in the thin line portion where the glass substrate surface was exposed by etching.

Figure 4:
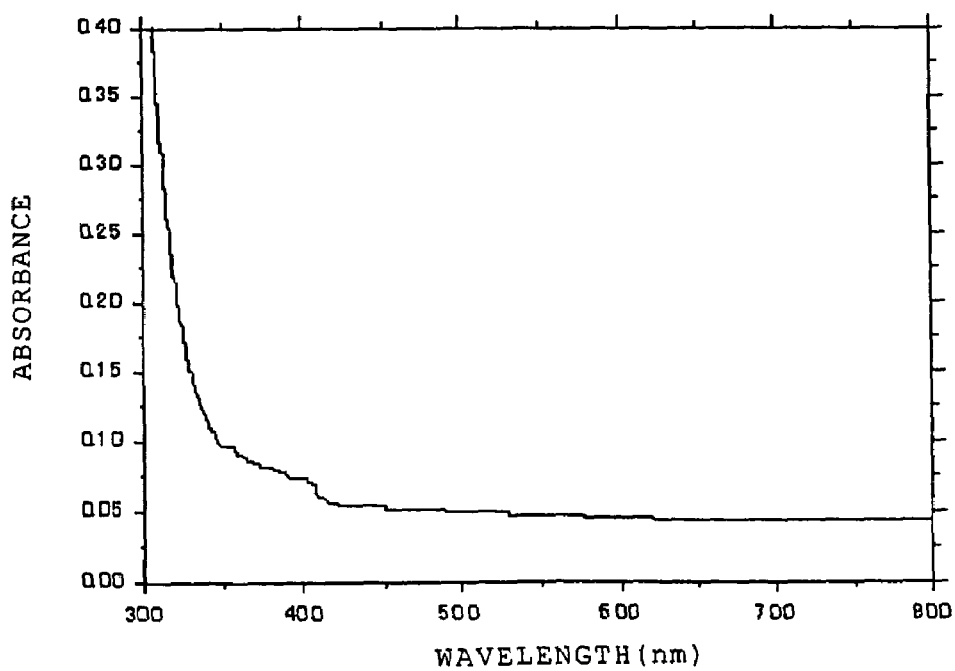
FIG. 4 is a graph showing the absorbance of the optical waveguide formed using glass substrate No. 1 in Example 4.

FIG. 4 shows the absorbance of the thin line portion, where copper(I) halides diffused, using borosilicate glass composition No. 1.

The invention claimed is:

1. A method for forming an optical waveguide, comprising applying a paste containing a copper compound, an organic resin and an organic solvent to a glass substrate containing an alkali metal as a component of the glass over the whole surface thereof or in a patterned form, and performing heat treatment at a temperature lower than the softening temperature of the glass substrate, whereby copper ions contained in the paste are diffused into the glass substrate as $Cu^+$ ions and the diffused copper ions exist as $Cu^+$ ions in the glass substrate.

2. The method for forming an optical waveguide according to claim 1, wherein the glass substrate is made of a silicate glass, borosilicate glass or phosphate glass, the glass comprising at least 2% by weight of alkali metal, calculated on an oxide basis.

3. The method for forming an optical waveguide according to claim 2, wherein the glass substrate is a borosilicate glass substrate comprising 40% to 82% by weight of $SiO_2$; 12% to 50% by weight of $B_2O_3$; 2% to 25% by weight of at least one component selected from the group consisting of $Na_2O$, $K_2O$, $Li_2O$, $Rb_2O$ and $Cs_2O$; up to 25% by weight of at least one component selected from the group consisting of MgO, CaO, BaO, ZnO, SrO and PbO; up to 20% by weight of at least one component selected from the group consisting of $Al_2O_3$, $La_2O_3$, $Y_2O_3$, $Ta_2O_5$ and $Gd_2O_3$; up to 10% by weight of at least one component selected from the group consisting of $Nb_2O_5$ and $ZrO_2$; up to 5% by weight of at least one component selected from the group consisting of $As_2O_3$, $Sb_2O_3$ and SnO; and 0.05% to 10% by weight of at least one component selected from the group consisting of Cl, Br and I.

4. An optical waveguide produced by a method according to claim 1, which is a slab optical waveguide or a channel optical waveguide.

5. An optical waveguide produced by a method according to claim 2, which is a slab optical waveguide or a channel optical waveguide.

6. An optical waveguide produced by a method according to claim 3, which is a slab optical waveguide or a channel optical waveguide.

7. The method for forming an optical waveguide according to claim 1, wherein said alkali metal is at least one selected from the group consisting of Li, Na and K.

8. The method for forming an optical waveguide according to claim 1, wherein said glass substrate comprises at least about 5% by weight of alkali metal, calculated on an oxide basis.

9. A method for forming an optical waveguide comprising applying a paste containing a copper compound, an organic resin and an organic solvent to a glass substrate containing an alkali metal as a component of the glass over the whole surface thereof or in a patterned form, and performing heat treatment at a temperature lower than the softening temperature of the glass substrate, wherein said glass substrate comprises at least about 10% by weight of alkali metal, calculated on an oxide basis.

10. The method for forming an optical waveguide according to claim 1, wherein said glass substrate comprises not more than about 30% by weight of alkali metal, calculated on an oxide basis.

11. The method for forming an optical waveguide according to claim 1, wherein said glass substrate comprises not more than about 20% by weight of alkali metal, calculated on an oxide basis.

12. A method for forming an optical waveguide comprising applying a paste containing a copper compound, an organic resin and an organic solvent to a glass substrate containing an alkali metal as a component of the glass over the whole surface thereof or in a patterned form, and performing heat treatment at a temperature lower than the softening temperature of the glass substrate, wherein said glass substrate is a silicate glass containing about 70% to about 74% by weight of $SiO_2$, about 13% to about 16% by weight of at least one component selected from the group consisting of $Li_2O$, $Na_2O$ and $K_2O$, about 10% to about 13% by weight of at least one component selected from the group consisting of CaO, MgO and BaO, and about 1.5% to about 2.5% by weight of $Al_2O_3$, calculated on an oxide basis.

13. The method for forming an optical waveguide according to claim 1, wherein said glass substrate is a borosilicate glass containing about 60% to about 80% by weight of $SiO_2$, about 10% to about 28% by weight of $B_2O_3$, about 5% to about 10% by weight of at least one component selected from the group consisting of $Li_2O$, $Na_2O$ and $K_2O$, and up to about 5% by weight of $Al_2O_3$, calculated on an oxide basis.

14. A method for forming an optical waveguide comprising applying a paste containing a copper compound, an organic resin and an organic solvent to a glass substrate containing an alkali metal as a component of the glass over the whole surface thereof or in a patterned form, and performing heat treatment at a temperature lower than the softening temperature of the glass substrate, wherein said glass substrate is a phosphate glass containing about 20% to about 50% by weight of $P_2O_5$, about 3% to about 35% by weight of $SiO_2$, about 10% to about 35% by weight of $Al_2O_3$, and about 5% to about 10% by weight of at least one component selected from the group consisting of $Li_2O$, $Na_2O$ and $K_2O$, calculated on an oxide basis.

15. The method for forming an optical waveguide according to claim 1, wherein said copper compound is at least one selected from the group consisting of $CuSO_4$, $CuF_2$, CuCl, $CuCl_2$, CuBr, $CuBr_2$, $Cu_2O$, CuO, $Cu(NO_3)_2$ and CuS.

16. A method for forming an optical waveguide comprising applying a paste containing a copper compound, an organic resin and an organic solvent to a glass substrate containing an alkali metal as a component of the glass over the whole surface thereof or in a patterned form, and performing heat treatment at a temperature lower than the softening temperature of the glass substrate, wherein said paste comprises at least one selected from the group consisting of $Na_2SO_4$, $K_2SO_4$, $NaNO_3$, $KNO_3$, NaCl, NaBr, KCl and KBr.

* * * * *